United States Patent [19]

Baigrie et al.

[11] Patent Number: 5,250,228

[45] Date of Patent: Oct. 5, 1993

[54] CONDUCTIVE POLYMER COMPOSITION

[75] Inventors: Stephen Baigrie, Swindon, United Kingdom; Edward F. Chu, Sunnyvale, Calif.; George B. Park, Swindon, United Kingdom; Vijay N. Reddy, San Mateo, Calif.; James A. Rinde, Fremont, Calif.; Robert P. Saltman, Redwood City, Calif.

[73] Assignee: Raychem Corporation, Menlo Park, Calif.

[21] Appl. No.: 788,655

[22] Filed: Nov. 6, 1991

[51] Int. Cl.$^5$ .................. H01B 1/00; H01B 1/70; H01B 1/22; H01B 1/24

[52] U.S. Cl. .................. 252/511; 252/512; 252/513; 252/518; 219/541; 219/547; 219/548; 219/553

[58] Field of Search .............. 252/511, 512, 513, 514, 252/518; 219/541, 546, 547, 548, 552, 553

[56] References Cited

U.S. PATENT DOCUMENTS

| | | | |
|---|---|---|---|
| 4,188,276 | 2/1980 | Lyons et al. | 204/159.17 |
| 4,237,441 | 12/1980 | van Konynenburg et al. | 338/22 R |
| 4,238,812 | 12/1980 | Middleman et al. | 361/106 |
| 4,317,027 | 2/1982 | Middleman et al. | 219/553 |
| 4,352,083 | 9/1982 | Middleman et al. | 338/23 |
| 4,388,607 | 6/1983 | Toy et al. | 338/22 SD |
| 4,413,301 | 11/1983 | Middleman et al. | 361/106 |
| 4,534,889 | 8/1985 | van Konynenburg et al. | 252/511 |
| 4,545,926 | 10/1985 | Fouts, Jr. et al. | 252/511 |
| 4,560,498 | 12/1985 | Horsma et al. | 252/511 |
| 4,661,559 | 4/1987 | Gardner et al. | 525/65 |
| 4,853,165 | 8/1989 | Rosenzweig et al. | 264/27 |
| 4,935,156 | 6/1990 | van Konynenburg et al. | 219/553 |
| 4,962,162 | 10/1990 | Kosuda et al. | 525/422 |
| 4,966,729 | 10/1990 | Carmona et al. | 252/511 |
| 5,049,850 | 9/1991 | Evans | 252/511 |
| 5,106,540 | 4/1992 | Barma et al. | 252/511 |

FOREIGN PATENT DOCUMENTS

| | | |
|---|---|---|
| 0274889A2 | 7/1988 | European Pat. Off. . |
| 0373440A2 | 6/1990 | European Pat. Off. . |
| 59-36156 | 2/1984 | Japan . |
| 60-120779 | 6/1985 | Japan . |
| 61-81476 | 4/1986 | Japan . |
| 62-141083 | 6/1987 | Japan . |
| 62-153349 | 7/1987 | Japan . |
| WO92/08073 | 5/1992 | PCT Int'l Appl. . |
| 2207676A | 2/1989 | United Kingdom . |

OTHER PUBLICATIONS

29th National SAMPE Symposium, Apr. 3-5, 1984, "Development of Resins for Damage Tolerant Composites—A Systematic Approach" (Daimant et al).

30th National SAMPE Symposium, Mar. 19-21, 1985, "Chemical Modification of Matrix Resin Networks with Engineering Thermoplastics II Morphology and Properties of Poly(Aryl Ether Sulfone) Modified Epoxy Networks" (Hedrick et al).

Engineered Materials Handbook, Engineering Plastics, vol. 2, pp. 240–241 Dec. 1988.

Journal of Applied Polymer Science, vol. 22, 3511-3524, 1978, "Thermoplastic—Thermosetting Hybrid Polymer Systems as Gap-Filling Adhesives" (Aharoni et al).

Saechtling International Plastics Handbook for the Technologist, Engineer and User, 2d edition, 1987, pp. 1–2.

The British Polymer Journal, vol. 15, Mar. 1983, "Addition of Polyethersulphone to Epoxy Resins", (Bucknall et al).

U.S. Application Ser. No. 07/462,893 (Soni et al), filed Jan. 3, 1990.

U.S. Application Ser. No. 07/609,682 (Rinde et al), filed Nov. 6, 1990.

Primary Examiner—Paul Lieberman
Assistant Examiner—M. Kopec
Attorney, Agent, or Firm—Marguerite E. Gerstner; Herbert G. Burkard

[57] ABSTRACT

A conductive polymer composition in which a particulate conductive filler is dispersed in a polymeric component which is a mixture of an essentially amorphous thermoplastic resin and a thermosetting resin. In preferred compositions, the amorphous thermoplastic resin and the thermosetting resin are substantially mutually soluble. In order to improve the thermal stability of the composition on exposure to successive thermal cycles, it is preferred that the composition be cured by heating the uncured mixture of amorphous thermoplastic resin, thermosetting resin, and particulate conductive filler at a rate of at least 15° C./minute to the cure temperature.

15 Claims, 6 Drawing Sheets

CONDUCTIVE POLYMER COMPOSITION

BACKGROUND OF THE INVENTION

1. Field of the Invention

This invention relates to conductive polymer compositions and electrical devices comprising them.

2. Introduction to the Invention

Conductive polymer compositions and electrical devices comprising them are well-known. Reference may be made, for example, to U.S. Pat. Nos. 4,188,276 (Lyons et al), 4,237,441 (van Konynenburg et al), 4,238,812 (Middleman et al), 4,317,027 (Middleman et al), 4,352,083 (Middleman et al), 4,388,607 (Toy et al), 4,413,301 (Middleman et al), 4,534,889 (van Konynenburg et al), 4,545,926 (Fouts et al), 4,560,498 (Hormsa et al), 4,935,156 (van Konynenburg et al), and 5,049,850 (Evans et al), and copending, commonly assigned application Ser. Nos. 07/75,929 (Barma et al, filed Jul. 21, 1987), now U.S. Pat. No. 5,106,540, issued Apr. 21, 1992, 07/114,488 (Blake et al, filed Oct. 28, 1987), and 07/462,893 (Soni et al, filed Jan. 3, 1990), the disclosures of which are incorporated herein by reference.

For many applications such as circuit protection devices and self-regulating heaters it is desirable that the conductive polymer composition exhibit positive temperature coefficient of resistance behavior (PTC), i.e. that the resistance of the composition increase anomalously as a function of temperature. Conventionally, conductive polymer compositions exhibiting PTC behavior have been made by mixing particulate conductive fillers with a crystalline polymer. For these materials, the temperature at which the resistance anomalously increases is dependent on the melting point of the polymer, i.e. the material generally "switches" into its high resistance state at a temperature, $T_s$, which is slightly below the melting point of the polymer. As a result, the range of available switching temperatures is limited by the melting points of available crystalline polymers.

U.S. Pat. No. 4,534,889 (van Konynenburg et al) describes a process for producing PTC behavior in a relatively noncrystalline elastomer by crosslinking the elastomer, in which conductive particles are dispersed, at a temperature $T_c$. If a sufficient level of crosslinking is imparted, the elastomer will exhibit PTC behavior at a temperature around $T_c$. However, because the matrix polymer is an elastomer, such materials may suffer from resistance instability when exposed to repeated thermal cycles or voltage applications.

U.S. Pat. No. 4,966,729 (Carmona et al) discloses a material in which conductive fibers are dispersed in a thermosetting polymer matrix, e.g. an epoxy or a silicone, in order to produce a material which has improved thermal stability and which can be mixed at room temperature. Following annealing, the material exhibits PTC behavior. Such materials, which contain relatively little conductive fiber, e.g. 1 to 3% by volume, are subject to nonuniform mixing, and settling of the fibers during annealing.

SUMMARY OF THE INVENTION

We have now found that useful conductive compositions can be made which are stable, easily and reproducibly processed, and which are capable of accepting large filler concentrations in order to provide low resistivities.

In a first aspect, this invention provides a conductive polymer composition which comprises (1) a polymeric component comprising
(a) an essentially amorphous thermoplastic resin, and
(b) a thermosetting resin; and
(2) a particulate conductive filler dispersed in the polymeric component.

In a second aspect, the invention provides an electrical device comprising (1) a resistive element comprising the composition of the first aspect which has been cured; and
(2) at least two electrodes which can be connected to a source of electrical power to cause current to flow through the resistive element.

In a third aspect, the invention provides a process for preparing a conductive polymer composition which exhibits stable resistance when exposed to thermal cycling, said process comprising (1) mixing together (a) an essentially amorphous thermoplastic resin, (b) a thermosetting resin, (c) a curing agent which has a curing temperature $T_{cure}$, and (d) a particulate conductive filler;
(2) shaping the mixture at a temperature less than $T_{cure}$; and
(3) heating the shaped mixture at a rate of at least 15° C./minute to a temperature of at least $T_{cure}$ and maintaining the shaped mixture at the temperature of at least $T_{cure}$ for a time sufficient to cure the mixture.

DETAILED DESCRIPTION OF THE INVENTION

The polymeric component of the conductive polymer composition comprises an essentially amorphous thermoplastic resin and a thermosetting resin. Amorphous thermoplastic resins are defined in Saechtling International Plastics Handbook for the Technologist, Engineer and User, Second Edition, 1987, Hanser Publishers, Munich, at page 1, the disclosure of which is incorporated herein by reference. The term "essentially amorphous" as used herein means that the resin has at most about 15% crystallinity, preferably at most about 10% crystallinity, particularly at most about 5% crystallinity, e.g. 0 to 5% crystallinity. The thermoplastic resin is of high molecular weight and may be rigid or rubbery at room temperature, serving to contribute strength, toughness, and high viscosity at ambient temperature to the conductive polymer composition in the uncured state. The thermoplastic resin is generally present in an amount from about 10 parts to about 75 parts, preferably from about 15 parts to about 60 parts, and particularly from about 25 parts to about 45 parts by weight of the total polymeric component. A mixture of different resins may be used if desired.

Among the amorphous thermoplastic resins that are suitable for use are polysulfones, polyethersulfones, polystyrene, polyphenylene oxide, polyamides, phenoxy resins, polyimides, polyetherimides, polyetherimide/silicone block copolymers, polyurethanes, polyesters, polycarbonates, acrylic resins such as polymethyl methacrylate, styrene/acrylonitrile, and styrene block copolymers. Particularly preferred resins are polyetherimides, such as the Ultem ™ resins commercially available from General Electric Company, polyetherimide/silicone block copolymers, such as the Siltem ™ resins commercially available from General Electric Company, polysulfones, such as Polysulfone P-1700 ™, commercially available from Union Carbide Corporation, polyarylsulfones, such as Radel ™ A200, commercially available from Amoco, polyethersulfones such as Victrex, ™ 300P, commercially available from ICI, and phenoxy resins, such as Phenoxy PKH-J ™ commercially available from Union Carbide Corporation.

Thermosetting resins suitable for use in the conductive polymer composition are defined on pages 1 and 2 of the Saechtling Plastics Handbook. The thermosetting resin is generally present in an amount from about 90 parts to about 25 parts, preferably from about 85 parts to about 40 parts, and particularly from about 75 to about 55 parts by weight of the polymeric component. The weight ratio of the thermoplastic resin to the thermosetting resin generally falls within a range from about 1:9 to about 3:1. The thermosetting resin preferably has a functionality greater than 2. At room temperature, the thermosetting resin may be a liquid or solid, and when cured (in the absence of the thermoplastic resin) it may be rigid or rubbery. If desired, mixtures of two or more thermosetting resins may be used.

Preferred thermosetting resins are uncured epoxy resins, particularly uncured liquid epoxy resins as defined in ASTM D 1763, incorporated herein by reference. Liquid epoxy resins are described in Volume 2 of Engineered Materials Handbook, Engineering Plastics, published by ASM International, particularly at pages 240-241, and the description therein is incorporated herein by reference.

The term "epoxy resin" is used herein to mean any of the conventional dimeric, oligomeric or polymeric epoxy materials containing a plurality, i.e. at least 2, of epoxy functional groups. Types of epoxy resins that can be used include, for example, the reaction product of bisphenol A and epichlorohydrin, the reaction product of phenol and formaldehyde (novolac resin) and epichlorohydrin, cycloaliphatic and peracid epoxies, glycidyl esters, the reaction product of epichlorohydrin and p-amino phenol, the reaction product of epichlorohydrin and glyoxal tetraphenol and the like.

Suitable commercially available epoxidic esters are preferably 3,4-epoxycyclohexylmethyl 3,4-epoxycyclohexane-carboxylate (Union Carbide ERL ™ 4221 or Ciba Geigy CY-179 ™ ), as well as bis(3,4,epoxycyclohexylmethyl)adipate (Union Carbide ERL ™ 4299).

Suitable commercially available diglycidic ethers of bisphenol-A are Ciba Geigy Araldite ™ 6010, Dow Chemical DER ™ 331, and Shell Chemical Epon ™ 825, 828, 826, 830,834, 836,1001, 1004, 1007, etc.

A polyepoxidized phenol formaldehyde novolac prepolymer is available from Dow Chemical as DEN ™ 431 and 438 and from Ciba Geigy as CY-281 ™, and a polyepoxidized cresol formaldehyde novolac prepolymer is available from Ciba Geigy as ECN ™ 1285, 1280 and 1299.

A polyglycidyl ether of polyhydric alcohol is available from Ciba Geigy, based on butane-1,4-diol, as Araldite ™ RD-2; and from Shell Chemical Corporation based on glycerine, as Epon ™ 812.

A suitable diepoxide of an alkylcycloalkyl hydrocarbon is vinyl cyclohexene dioxide, Union Carbide ERL ™ 4206; and a suitable diepoxide of a cycloalkyl ether is bis(2,3-epoxycyclopentyl)-ether, Union Carbide ERL ™ 0400.

Suitable commercially available flexible epoxy resins include polyglycol diepoxies, DER ™ 732 and 736, from Dow Chemical Company, diglycidyl ester of linoleic dimer acid, Epon ™ 871 and 872 from Shell Chemical Company, and diglycidyl ester of a bisphenol in which the aromatic rings are linked by a long aliphatic chain, Lekutherm ™ X-80, from Mobay Chemical Company.

High functional epoxy resins (i.e. functionality greater than 2) which can be used include, for example, a solid epoxy novolac resin, DEN ™ 485 from Dow Chemical Company, a tetrafunctional solid epoxy resin, Epon ™ 1031 from Shell Chemical Company, and N,N,N',N'-tetraglycidyl-4,4'-methylenebisbenzenamine, Araldite ™ MY 720 from Ciba Corporation. Difunctional epoxy resins which can be used include, for example, a solid resin, N,N,N',N'-tetraglycidyl-a, a'-bis(4-aminophenyl)-p-diisopropylbenzene, HPT ™ 1071 from Shell Chemical Company, solid diglycidyl ether of bisphenol-9fluorene, HPT ™ 1079 from Shell Chemical Company, and triglycidylether of para-aminophenol, Araldite ™ 0500/0510 from Ciba-Geigy Corporation.

It is preferred that the thermosetting and thermoplastic resins be substantially mutually soluble. The term "substantially mutually soluble" as used herein means that the resins, when mixed, form a solution having a single glass transition temperature ($T_g$). Because the resins are miscible with one another, during mixing the thermoplastic resin dissolves in the thermosetting resin. In this way, the glass transition temperature of the thermoplastic resin decreases substantially, allowing mixing to occur at temperatures well below the normal softening temperature of the thermoplastic resin. The resulting mixture is a solid at room temperature, allowing easy weighing and storage. For example, even if the thermosetting resin is a liquid epoxy resin, after blending with the thermoplastic resin, the resulting mixture is not itself liquid but is instead a material which can be formed into a tough leathery film. The mixed thermoplastic resin and thermosetting resin have a relatively high viscosity at 25° C., e.g. $10^5$ to $10^7$ poise, an important factor is preventing settling or redistribution of the particulate conductive filler. In addition, the mixed thermoplastic resin and thermosetting resin have a sufficiently low viscosity in the temperature range commonly used for mixing (about 40° C. to 100° C.), e.g. $10^4$ to $10^5$ poise at 60° C., to allow compounding and good dispersion of particulate conductive fillers, curing agents, and other additives. Examples of a number of suitable mixtures of amorphous thermoplastic resins and thermosetting resins are found in copending U.S. application Ser. No. 07/609,682 (Rinde, filed Nov. 6, 1990) now abandoned and International Application No. PCT/US91/08259, published May 14, 1992 as International Publication No. WO92/08073, (Raychem Corporation, MP1332-PCT) filed contemporaneously with this application, the disclosures of which are incorporated herein by reference.

In addition to the thermoplastic resin and the thermosetting resin, the composition generally comprises as part of the polymeric component a relatively high temperature curing agent in order to "cure", i.e. crosslink or catalyze polymerization of, the thermosetting resin which is present. The curing agent is selected to provide rapid curing of the epoxy resin at a temperature $T_{cure}$ which exceeds the temperature at which the thermoplastic resin, the uncured epoxy resin and the epoxy curing agent are mixed. The curing agent must not initiate substantial curing during mixing, a process which generally is conducted in the range from about 25° C. to about 100° C. The epoxy curing agent is present in an amount such that the adhesive will cure upon its being heated to a temperature above the mixing temperature. It is preferred that the curing agent will not initiate substantial curing at temperatures below about 100° C. and is such that the conductive composition will remain substantially uncured for at least about one year, more preferably two or more years, at 25° C. Suitable curing agents for an epoxy thermosetting resin may be isophthaloyl dihydrazide, benzephenone tetracarboxylic dianhydride, diethyltoluene diamine, 3,5-dimethylthio-2,4-toluene diamine, dicyandiamide (Dicy TM) which can be obtained, for example, from American Cyanamid, Curazol TM 2PHZ, which is a substituted imidazole obtainable from Pacific Anchor, DDS, diaminodiphenyl sulfone, obtainable from Ciba-Geigy, or Calcure TM, a substituted urea available from Pacific Anchor. Other epoxy curing agents which can be used include, for example, substituted dicyandiamides, such as 2,6-xylenyl biguanide, solid polyamides, such as HT-939 TM available from Ciba-Geigy, Ancamine TM 2014AS available from Pacific Anchor, solid aromatic amines HPT TM 1061 and 1062 available from Shell, solid anhydride hardeners, such as pyromellitic dianhydride, phenolic resin hardeners, such as poly(p-hydroxy styrene), imidazoles, 2-phenyl-4,5-dihydroxymethylimidazole and 2,4-diamino-6 [2'-methylimidazolyl-(1)]ethyl-s-triazine isocyanate adduct, boron trifluoride:amine complexes, such as Anchor TM 1222 and 1907 from Pacific Anchor, and trimethylol propane triacrylate.

A preferred curing agent for an epoxy thermosetting resin is dicyandiamide. A curing accelerator can be used together with the dicyandiamide. Typical accelerators include urea, a urea compound, such as, 3-phenyl-1,1-dimethylurea, 3-(4-chlorophenyl)-1,1-dimethyl urea, 3-(3,4-dichlorophenyl)-1,1-dimethyl urea, 3-(3-chloro-4-methylphenyl)-1,1-dimethyl urea, or an imidazole such as, 2-heptadecylimidazole, 1-cyanoethyl-2-phenylimidazole-trimellitate or 2-[β-{2'-methylimidazoyl-(1')}]-ethyl-4,6-diamino-s-triazine.

If the thermosetting resin is a urethane, the curing agent can be a blocked isocyanate such as an alkyl phenol blocked isocyanate, such as Desmocap TM 11A, available from Mobay Corporation or a phenol blocked polyisocyanate adduct, Mondur TM S available from Mobay Corporation.

If the thermosetting resin is an unsaturated polyester resin, the curing agent can be a peroxide or other free radical catalyst such as dicumyl peroxide, 2,5-dimethyl-2,5-di(t-butylperoxy)hexane, t-butyl cumyl peroxide, 2,5-dimethyl-2,5-di(t-butylperoxy)hexyne-3. Unsaturated polyester resins can be crosslinked by irradiation, e.g. by ultra violet radiation, high energy electrons or gamma radiation.

Some thermosetting resins require no curing agent in order to cure. For example, if the thermosetting resin is a bismaleimide, the resin will crosslink at elevated temperatures. Co-curing resins such as O,O'-diallyl bisphenol A can be included to toughen the cured bismaleimide.

Many of the resins described in the detailed description of the invention can be cured by the use of peroxide crosslinking agents, high energy electrons, or gamma radiation. For these materials, it is often preferred to add unsaturated crosslinking aids such as triallyl isocyanurate, triallyl cyanurate, or trimethylol propane triacrylate.

An electrically conductive particulate filler is dispersed in the polymer component in order to provide electrical conductivity or static dissipation. Suitable particulate conductive fillers include carbon black, graphite, metals such as nickel, copper, and silver, metal oxides, metal-coated particles such as nickel-coated carbon fibers, nickel-coated carbon black, nickel-coated polymeric fibers, or silver-coated glass, or a combination of these. The amount of conductive filler required is dependent on the properties of the filler itself, the resins in the polymeric component, the desired resistivity, and the extent of cure of the composition. In general, the conductive filler is present at 5 to 65%, preferably 10 to 60%, particularly 15 to 55%, especially 20 to 50% by volume of the polymeric component. For static dissipation applications, a resistivity of approximately $10^6$ to $10^9$ ohm-cm is preferred. For heaters, a resistivity of approximately $10^2$ to $10^6$ ohm-cm is preferred. For both static dissipation and heater applications, it is preferred that the particulate conductive filler comprise carbon black. Suitable carbon blacks for compositions exhibiting PTC behavior include Raven TM 430 (available from Columbian Chemicals) and Vulcan TM XC-72 (available from Cabot), at a loading of 10 to 40% by volume, preferably 15 to 35% by volume, particularly 20 to 35% by volume of the polymeric component. For some applications, in which the composition exhibits ZTC (zero temperature coefficient of resistance) behavior, highly conductive carbon blacks such as Ketjenblack TM EC (available from Akzo Chemie), Conductex TM 975 (available from Cabot), or Printex TM XE-2 (available from DeGussa) are used and the loading of carbon black is much lower, generally 2 to 15% by volume, preferably 5 to 12% by volume, particularly 5 to 10% by volume. When the composition is to be used in a circuit protection device or a conductive "tie" layer between an electrode and another conductive layer, a resistivity of $10^{-4}$ to $10^2$ ohm-cm is preferred. For these conductive compositions, although carbon black may be used, it is preferred that the conductive filler comprise metal particles such as nickel, e.g. Inco TM 255 (available from Novamet), or silver, e.g. FS-2 TM flake, (available from Johnson Matthey Electronic Materials), or fibers, e.g. Cycom TM NCG nickel-coated carbon fibers (available from American Cyanamid), or other metal-coated fibers such as glass, graphite, or polymer. When metal is used as the particulate filler, because of its relatively high density compared to the resins, the loading can be high, generally 20 to 60% by volume of the polymeric component, preferably 30 to 60% by volume, particularly 35 to 60% by volume. Because of the relatively high viscosity and ductility of the polymeric component, a relatively large quantity of particulate filler can be successfully incorporated into the composition without substantially adversely affecting the physical properties and ability to process the filled composition.

Additional components may also be present in the conductive polymer composition. Among these components are inert fillers such as polymeric powders such as polytetrafluoroethylene (e.g. Teflon TM powder), nylon, ETFE, polyethylene, and other plastic powders; inorganic fillers such as fumed silica, calcium carbonate, magnesium carbonate, aluminum hydroxide, kaolin, and talc; chopped glass or continuous glass; fibers such as Kevlar ™ polyaramide fiber (available from DuPont), fiberglass, and other reinforcing fibers; thermally conductive fillers such as boron nitride, alumina, and aluminum nitride; and other components such as stabilizers, antioxidants, accelerators, pigments, foaming agents, fungicides and the like. Depending on the type of additional component, up to about 30 volume percent filler can be present.

The compositions of the invention may be used in a variety of applications and the form of the material is dependent on the application. In cases where the compositions serve as conductive adhesives, they may be in the form of self-supporting sheets which can be applied to a substrate. For other applications, e.g. circuit protection devices or heaters, the compositions may be shaped, e.g. by molding or another shaping technique, into a suitable configuration.

For many applications, it is desirable that the conductive polymer composition exhibit PTC behavior. The term "PTC behavior" is used in this specification to denote a composition or an electrical device which has an $R_{14}$ value of at least 2.5 and/or an $R_{100}$ value of at least 10, and it is particularly preferred that the composition should have an $R_{30}$ value of at least 6, where $R_{14}$ is the ratio of the resistivities at the end and the beginning of a 14° C. temperature range, $R_{100}$ is the ratio of the resistivities at the end and the beginning of a 100° C. range, and $R_{30}$ is the ratio of the resistivities at the end and the beginning of a 30° C. range. Compositions which exhibit PTC behavior are particularly useful in making electrical devices such as circuit protection devices or self-regulating heaters. Such devices comprise a resistive element comprising a polymeric component which is made from the conductive polymer composition, and two electrodes which can be connected to a source of electrical power to cause current to flow through the resistive element. Appropriate electrodes are selected depending on the shape of the resistive element. Electrodes may comprise metal wires or braid, e.g. for attachment to or embedment into the resistive element, or they may comprise metal foil or mesh, or conductive paint, or any other suitable material. Generally circuit protection devices have a resistance at room temperature of less than 100 ohms.

Figure 1:
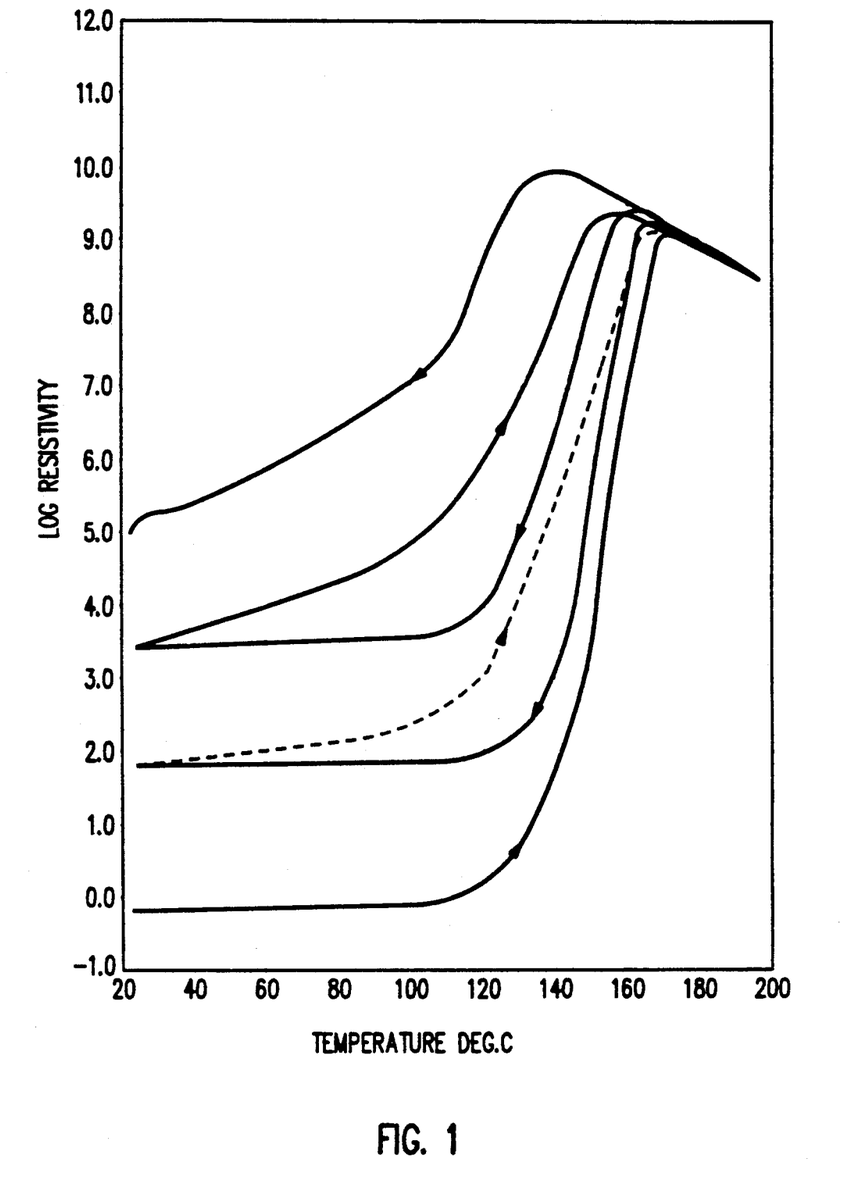
FIGS. 1 to 4 show resistivity vs. temperature (R(T)) curves for two conductive polymer compositions.

Compositions of this invention which exhibit PTC behavior are particularly useful because they exhibit stable resistance behavior when they are cycled from room temperature to a temperature above the curing temperature $T_{cure}$, i.e. they do not display "ratcheting". In this specification, the term ratcheting is used to describe the phenomenon of successively increased resistance at 25° C. at the end of each cycle of successive temperature cycles from a temperature at or below 25° C. to a temperature greater than $T_{cure}$. FIG. 1, which illustrates a graph of the resistivity in ohm-cm as a function of temperature for a conductive polymer composition, demonstrates substantial ratcheting. We have discovered that ratcheting can be minimized by curing the uncured composition of the invention very rapidly, i.e. they are heated very rapidly to $T_{cure}$ at the start of the curing process; for example, the rate of increase in temperature from 25° C. to $T_{cure}$ for the uncured Composition may be at least 15° C./minute, preferably at least 25° C./minute, particularly at least 30° C./minute, especially at least 40° C./minute, e.g. 50 to 100° C./minute. In order to achieve this rapid rate of increase, it is preferred that the area of the conductive composition which is exposed to the heat be as large as possible. Thus, it is preferred that the composition be shaped in a manner to maximize its surface area, e.g. by pressing it into a thin sheet or film. In one preferred technique, the uncured composition is compression molded into a thin sheet, e.g. about 0.02 inch (0.05 cm) or less, and the sheet is then inserted into a press in which the platens are preheated to the desired curing temperature. When the platens are closed, the heat from the platens rapidly transfers to the sheet and the sheet is cured under pressure (e.g. 10,000 lbs/4545 kg). For many materials, it is then necessary to further condition and completely cure the composition by maintaining it at the elevated $T_{cure}$ for an extended time. The appropriate conditioning time depends on the particular material, but may range from one to twenty hours.

The temperature at which the composition is cured affects the temperature at which the resistance anomalously increases. In general, the higher $T_{cure}$, the higher the temperature at which the composition "switches" into its high resistance state.

The invention is illustrated by the drawing in which FIGS. 1 to 4 show graphs of the resistivity in ohm-cm as a function of temperature in degrees Celsius for four compositions of the invention. Sequential thermal cycles are shown by arrows. The composition in FIG. 1 has been cured at 175° C. for 3 hours; the composition in FIG. 2 has been cured at 175° C. for 16 hours; the composition in FIG. 3 has been cured at 175° C. for 3 hours but has had an initial rate of increase in temperature of about 55° C./minute and exhibits little ratcheting; and the composition in FIG. 4 has been cured at 200° C. for 3 hours.

Figure 5:
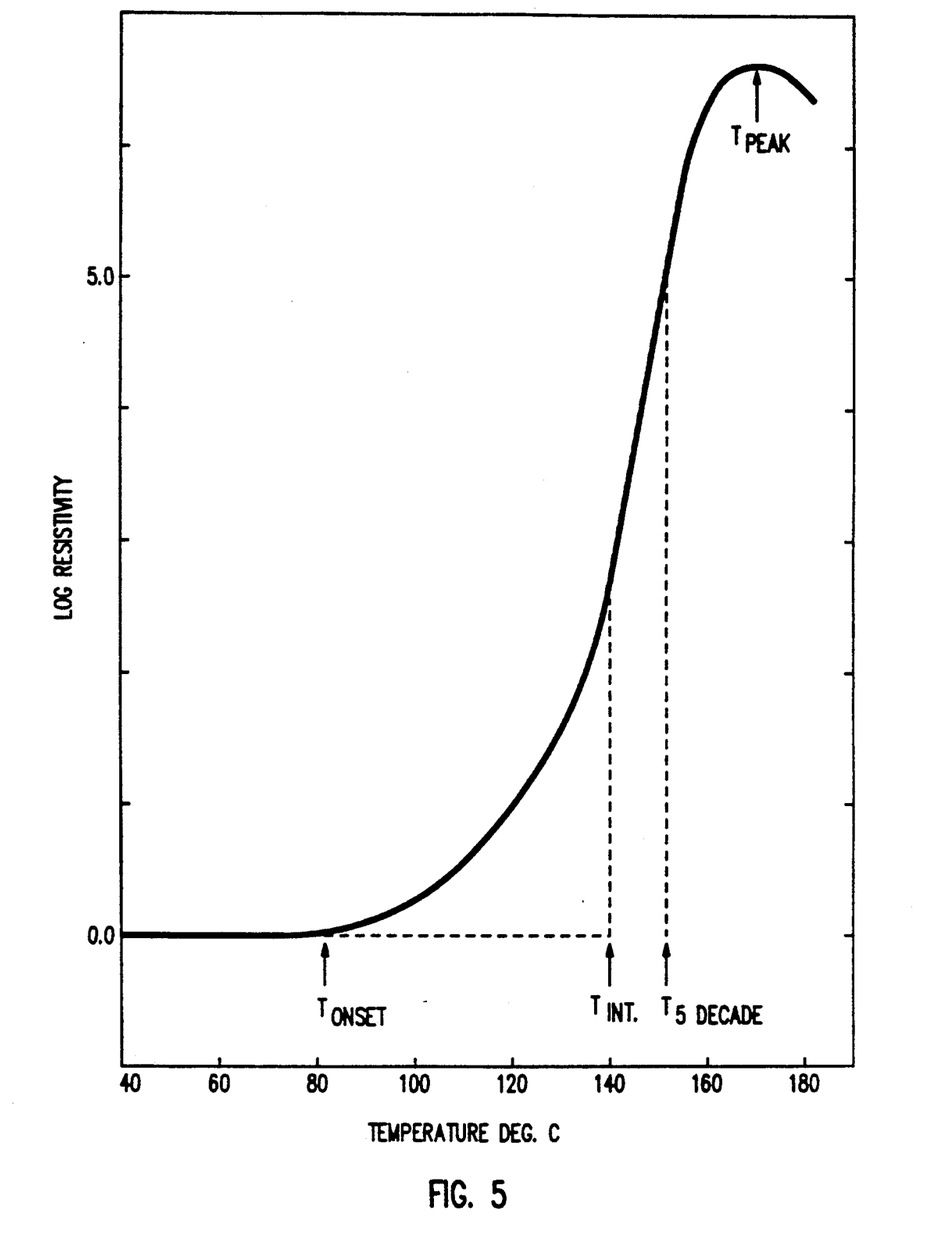
FIG. 5 is a schematic R(T) curve for a composition of the invention.

FIG. 5 shows a schematic resistivity vs. temperature (R(T)) curve which indicates $T_{onset}$, the temperature at which the PTC anomaly begins, $T_{intersect}$, the temperature at which a line drawn tangent to the steep part of the R(T) curve intersects with a line drawn tangent to the line at temperatures below $T_{onset}$, $T_5$, the temperature at which the resistivity is $10^5$ times greater than the initial resistivity, and $T_{peak}$, the temperature at which the maximum resistivity is recorded.

Figure 6:
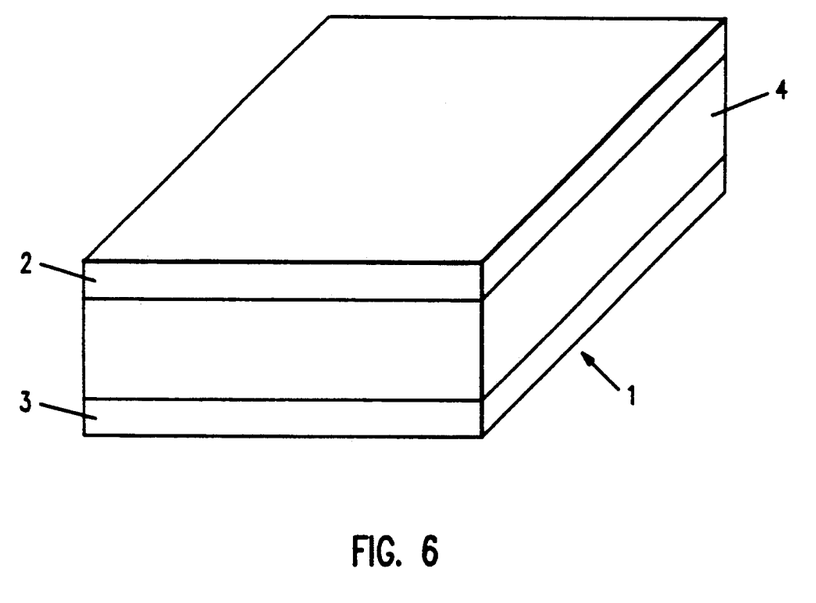
FIG. 6 is an electrical device of the invention.

FIG. 6 shows an electrical device 1 of the invention which comprises metal electrodes 2,3 attached to opposite sides of a laminar resistive element 4 which comprises a conductive polymer composition of the invention.

The invention is illustrated by the following examples.

EXAMPLE 1

Figure 2:
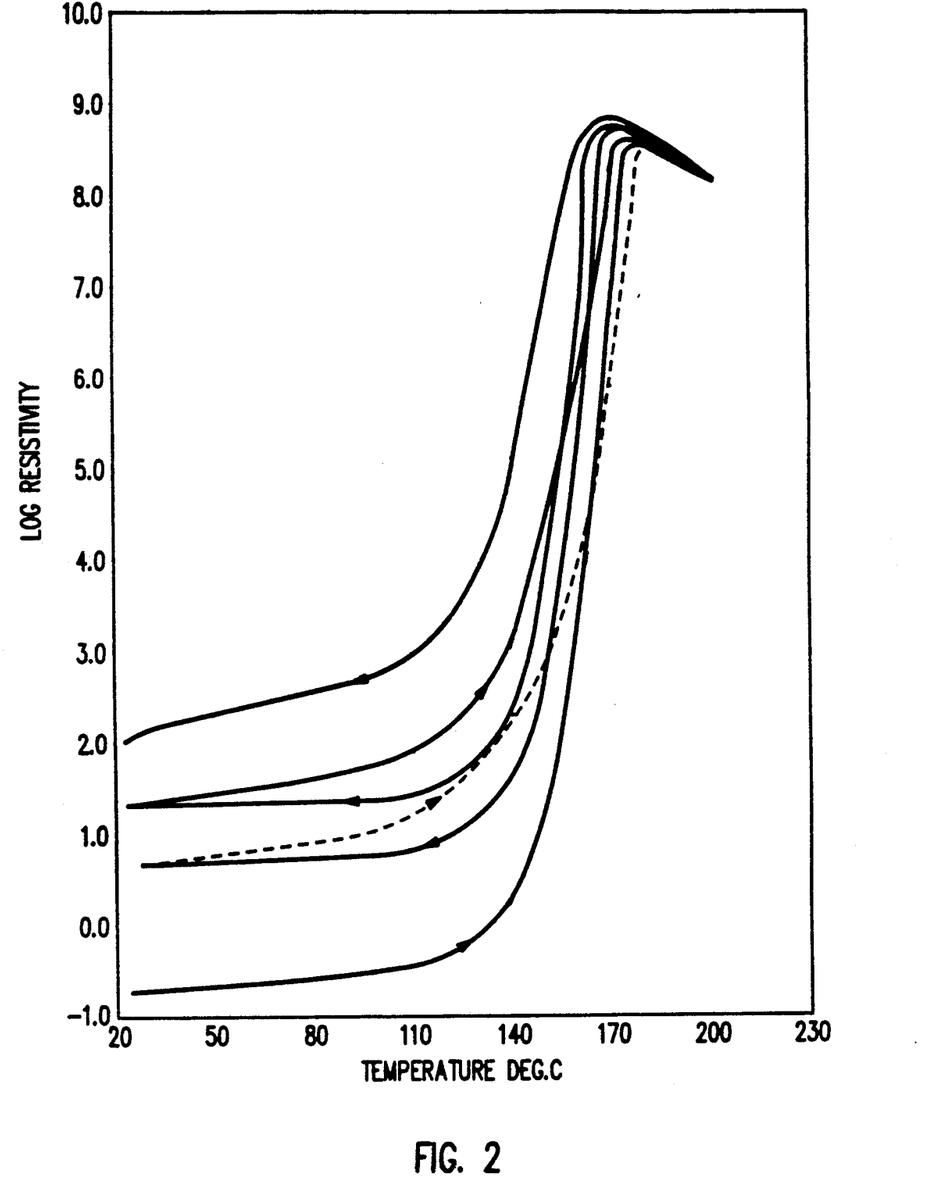

In a one liter resin kettle were charged 180 grams (30% by weight) of powdered Ultem ™ 1000 polyetherimide (available from General Electric Company) and 420 grams (70% by weight) of Epon ™ 825 epoxy (available from Shell). The mixture was stirred and heated until the thermoplastic resin dissolved in the epoxy resin. The material was poured onto release paper and cooled to room temperature to form a masterbatch. In a Brabender ™ mixer with a total capacity of 50 cm³, 35% by volume of Inco ™ 255 nickel particles (available from Novamet) was mixed with 65% by volume of the cooled masterbatch; 0.5% by weight of the masterbatch dicyandiamide curing agent and 0.25% by weight of the masterbatch Calcure ™ 3-phenyl-1,1- dimethylurea (available from Pacific Anchor) were added. The mixture was mixed for about 10 minutes at 30 RPMs until uniform. The mixture was compression-molded into a sheet about 0.02 inch (0.05 cm) thick, and the sheet was cured at 175° C. for 16 hours. A sample was cut from the sheet and electrodes were attached. The resistivity vs. temperature (i.e. R(T) curve) behavior for the sample was measured and is shown in FIG. 2. Shown in Table I are specific points taken from the R(T) curve, including the resistivity at 25° C., $\rho_{25}$, as well as N, the number of decades of PTC anomaly from the initial resistivity to peak resistivity measured on the first thermal cycle.

TABLE I

| Example | 1 | 2 | 3 | 4 | 5 | 6 | 7 |
|---|---|---|---|---|---|---|---|
| Cure T(°C.) | 175 | 200 | 175* | 175 | 175 | 175 | 200 |
| Cure time (hr) | 16 | 3 | 3 | 16 | 16 | 16 | 3 |
| $T_{onset}$ °C. | 85 | 100 | 80 | 85 | 110 | 110 | 130 |
| $T_{intersect}$ °C. | 140 | 160 | 175 | 155 | 180 | 165 | 180 |
| $T_5$ °C. | 160 | 190 | 180 | 170 | 195 | 185 | >230 |
| $T_{peak}$ °C. | 170 | 210 | 195 | 180 | 205 | 210 | >230 |
| $\rho 25$ ohm-cm | <1 | <1 | 10 | <1 | <1 | <1 | <1 |
| N (decades) | >9 | >9 | 7 | >9 | 8 | >8 | 6 |

*Indicates a rapid rate of temperature increase at start of cure.

EXAMPLE 2

Figure 4:
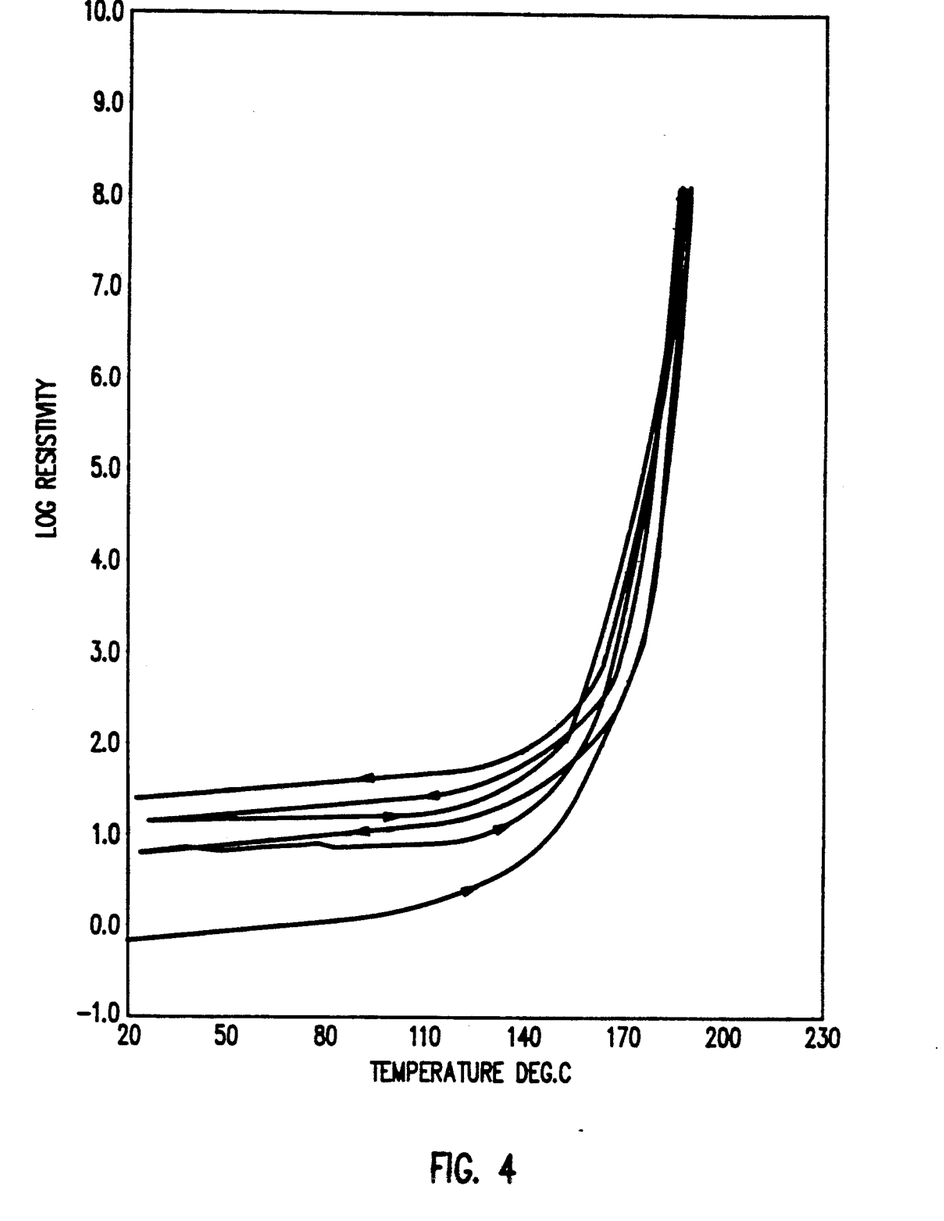

A sample prepared as in Example 1 was cured for 3 hours at 200° C. The R(T) curve is shown in FIG. 4.

EXAMPLE 3

Figure 3:
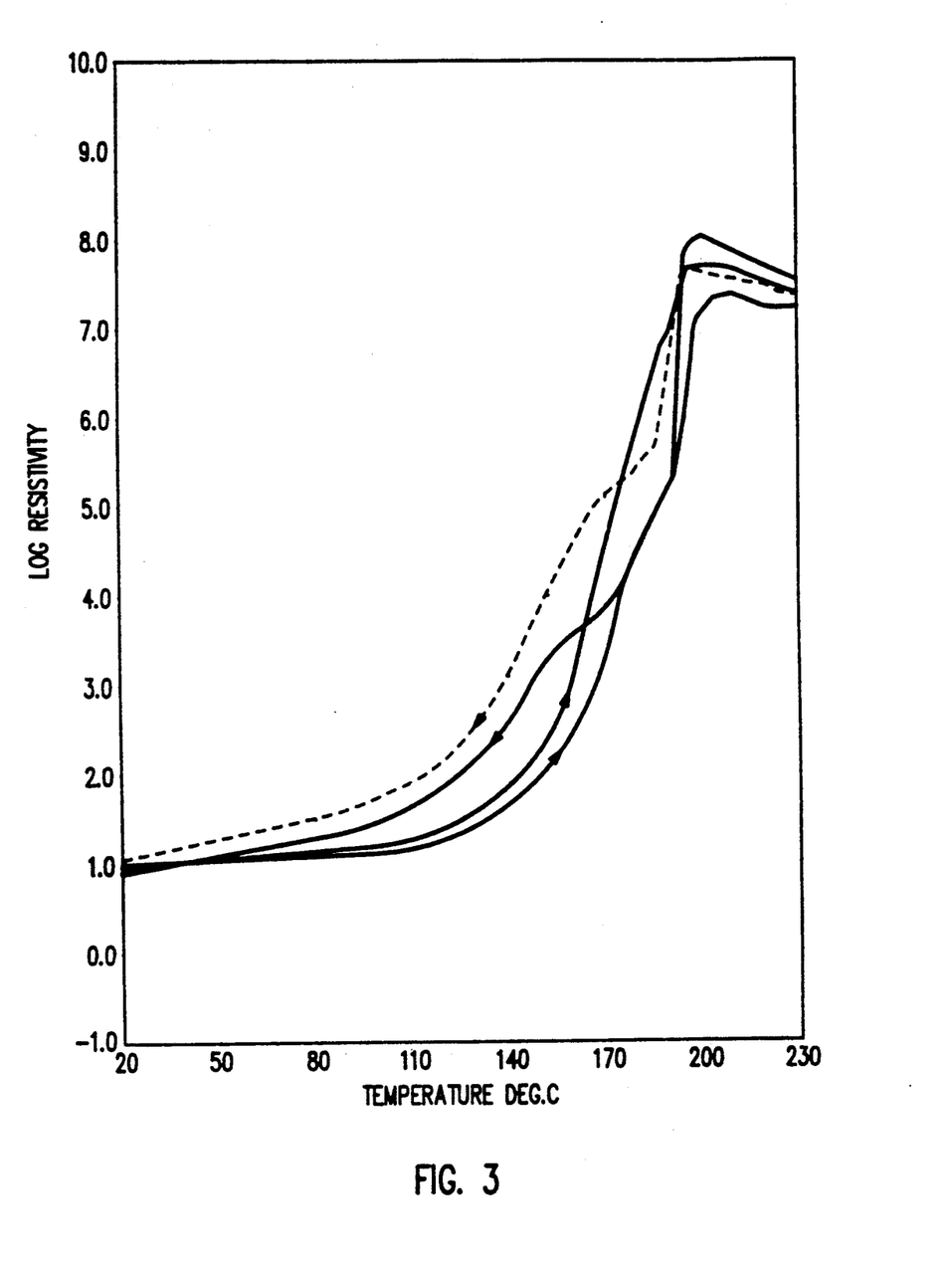

A sample prepared as in Example 1 was cured under 10,000 lbs (4545 kg) pressure in a press heated to 175° C. and achieved a rate of temperature increase of 55° C./minute as measured by thermocouples inserted in the material. The sample was then maintained at 175° C. for three hours to complete curing. The R(T) curve is shown in FIG. 3.

EXAMPLE 4

A sample was prepared as in Example 1, except that the Ultem 1000 was replaced by anhydride terminated Ultem resin.

EXAMPLE 5

A sample was prepared as in Example 1, except that the Ultem 1000 was replaced by Udel TM P-1700 polysulfone (available from Union Carbide).

EXAMPLES 6 AND 7

Samples were prepared as in Example 1, except that the Ultem 1000 was replaced by Phenoxy PKH-J TM phenoxy (available from Union Carbide).

EXAMPLE 8

A sample was prepared as in Example 1, except that 20% by volume Raven TM 430 carbon black (available from Columbian Chemicals) was added in place of the nickel filler. After curing at 175° C. for 3 hours, the composition had a resistivity at 25° C. of $6.7 \times 10^8$ ohm-cm.

EXAMPLE 9

A sample was prepared as in Example 8, except that the carbon black loading was 25% by volume. After curing at 175° C. for 3 hours, the composition had a resistivity at 25° C. of $3.4 \times 10^6$ ohm-cm.

EXAMPLE 10

A sample was prepared as in Example 8, except that the carbon black loading was 40% by volume. After curing at 175° C. for 3 hours, the composition had a resistivity at 25° C. of 61 ohm-cm.

EXAMPLES 11 TO 13

Samples were prepared as in Example 1, except that the nickel filler was replaced by FS-2 TM silver flake (available from Johnson Matthey Electronic Materials) in the loadings shown in Table II. The samples, which were 1 inch (2.5 cm)×3 inch (7.62 cm)×0.030 inch (0.076 cm), were cured for one hour at 175° C.

TABLE II

| Example: | 11 | 12 | 13 |
|---|---|---|---|
| Volume % Ag | 45.6 | 39.3 | 31.4 |
| Grams Ag | 239.39 | 206.31 | 164.68 |
| Grams masterbatch | 32.64 | 36.40 | 41.17 |
| Resistivity (ohm-cm at 25° C.) | 0.0056 | 0.0183 | 0.0443 |

What is claimed is:

1. A conductive polymer composition which consists essentially of
   (1) a polymeric component consisting essentially of
      (a) 10 to 75 parts by weight of the total polymeric component of an essentially amorphous thermoplastic resin, and
      (b) 90 to 25 parts by weight of the total polymeric component of a thermosetting resin; and
   (2) a particulate conductive filler dispersed in the polymeric component which is 5 to 65% by volume of the polymeric component; and
   (3) the optional presence of a curing agent; and
   (4) the optional presence of a curing accelerator, said essentially amorphous thermoplastic resin and said thermosetting resin being substantially mutually soluble.

2. A composition according to claim 1 wherein the amorphous thermoplastic resin is selected from the group consisting of polysulfones, polyethersulfones, polystyrene, polyphenylene oxide, polyamides, phenoxy resins, polyimides, polyetherimides, polyetherimide/silicon block copolymers, polyurethanes, polyesters, polycarbonates, acrylic resins, polymethyl methacrylate, styrene/acrylonitrile, and styrene block copolymers.

3. A composition according to claim 1 wherein the thermosetting resin is selected from the group consisting of epoxy resins, polyurethanes, bismaleimide resins, unsaturated polyesters, triallyl isocyanurate, triallyl cyanurate, and trimethylol propane triacrylate.

4. A composition according to claim 1 wherein the curing agent is selected from the group consisting of isophthaloyl dihydrazide, benzephenone tetracarboxylic dianhydride, diethyltoluene diamine, 3,5-dimethylthio-2,4-toluene diamine, dicyandiamide, substituted imidazoles, diaminodiphenyl sulfone, substituted ureas, substituted dicyandiamides, solid polyamides, solid aromatic amines, solid anhydrides, pyromellitic dianhydride, phenolic resin hardeners, poly(p-hydroxy styrene), imidazoles, 2-phenyl-4,5-dihydroxymethylimidazole and 2,4-diamino-6 [2'-methylimidazolyl-(1)]ethyl-s-triazine isocyanate adduct, boron trifluoride:amine complexes, triallyl isocyanurate, triallyl cyanurate, trimethylol propane triacrylate, peroxide, and tributyl-tin-dilaurate.

5. A composition according to claim 1 wherein the particulate conductive filler comprises carbon black.

6. A composition according to claim 1 wherein the particulate conductive filler comprises a metal.

7. A composition according to claim 1 wherein the resistivity is $10^6$ to $10^9$ ohm-cm.

8. A composition according to claim 1 wherein the resistivity is $10^{-4}$ to $10^2$ ohm-cm.

9. A composition according to claim 1 which exhibits PTC behavior.

10. A composition according to claim 1 which is cured.

11. A composition according to claim 1 which has been crosslinked by radiation.

12. An electrical device which comprises
   (1) a resistive element comprising a conductive polymer composition which consists essentially of
      (a) a polymeric component which consists essentially of (i) 10 to 75 parts by weight of the total polymeric component of an essentially amorphous thermoplastic resin, and (ii) 90 to 25 parts by weight of the total polymeric component of a thermosetting resin; and
      (b) a particulate conductive filler dispersed in the polymeric component which is 5 to 65% by volume of the polymeric component; and
      (c) the optional presence of a curing agent; and
      (d) the optional presence of a curing accelerator, said essentially amorphous thermoplastic resin and said thermosetting resin being substantially mutually soluble and said conductive polymer composition being in a cured state; and
   (2) at least two electrodes which can be connected to a source of electrical power to cause current to flow through the resistive element.

13. A device according to claim 12 which has a resistance of less than 100 ohms.

14. A conductive polymer composition which exhibits ZTC behavior and which consists essentially of
   (1) a polymeric component consisting essentially of
      (a) 10 to 75 parts by weight of the total polymeric component of an essentially amorphous thermoplastic resin, and
      (b) 90 to 25 parts by weight of the total polymeric component of a thermosetting resin; and
   (2) a particulate conductive filler dispersed in the polymeric component which
      (a) is 2 to 15% by volume of the polymeric component and
      (b) comprises carbon black,
   said essentially amorphous thermoplastic resin and said thermosetting resin being substantially mutually soluble.

15. A composition according to claim 14 wherein the conductive filler is 5 to 12% by volume of the polymeric component.

* * * * *

UNITED STATES PATENT AND TRADEMARK OFFICE
CERTIFICATE OF CORRECTION

PATENT NO. : 5,250,228
DATED : October 5, 1993
INVENTOR(S) : Baigrie et al

It is certified that error appears in the above-indentified patent and that said Letters Patent is hereby corrected as shown below:

Column 1, line 16, replace "(Hormsa" by --(Horsma --.

Column 4, line 18, replace "Ciba" by --Ciba Geigy--.

Column 8, line 66, replace "0.5%" by --5.0%--.

Column 8, line 67, replace "0.25%" by --2.5%--.

Signed and Sealed this

Eighteenth Day of October, 1994

Attest:

BRUCE LEHMAN

Attesting Officer        Commissioner of Patents and Trademarks